United States Patent [19]
Andrei et al.

[11] Patent Number: 5,873,915
[45] Date of Patent: Feb. 23, 1999

[54] ELECTROLYTIC MEMBRANE AND PROCESS FOR ITS PHOTO-CROSSLINKING ON A CATHODIC MEMBRANE

[75] Inventors: Maria Andrei, Berceto; Federico Capuano, Rieti; Massimo Soprani, Borgosesia, all of Italy

[73] Assignees: Eniricherche S.p.A., Milano; Olivetti Personal Computers S.p.A., Torino, both of Italy

[21] Appl. No.: 938,901

[22] Filed: Sep. 26, 1997

Related U.S. Application Data

[63] Continuation of Ser. No. 740,562, Oct. 30, 1996, Pat. No. 5,741,610.

[30] Foreign Application Priority Data

Nov. 17, 1995 [IT] Italy .................................. MI95A2369

[51] Int. Cl.$^6$ .................................................. H01M 6/00
[52] U.S. Cl. ........................ 29/623.1; 29/623.5; 429/192
[58] Field of Search ........................... 429/192; 29/623.1, 29/623.5

[56] References Cited

U.S. PATENT DOCUMENTS

| | | | |
|---|---|---|---|
| 5,173,205 | 12/1992 | Marchese et al. | 429/192 |
| 5,394,264 | 2/1995 | Marchese et al. | 429/192 |
| 5,417,870 | 5/1995 | Andrei et al. | 429/192 |
| 5,501,920 | 3/1996 | Andrei et al. | 429/192 |
| 5,741,610 | 4/1998 | Andrei et al. | 429/192 |

FOREIGN PATENT DOCUMENTS

| | | |
|---|---|---|
| 0 397 523 | 11/1990 | European Pat. Off. |
| 0 557 250 | 8/1993 | European Pat. Off. |
| 0 638 950 | 2/1995 | European Pat. Off. |

OTHER PUBLICATIONS

Journal of Power Sources, vol. 52, No. 2, Dec. 1, 1994, pp. 261–268, XP000532768, Kumar B. et al., "Polymer–Ceramic Composite Electrolytes".

*Primary Examiner*—Bruce F. Bell
*Attorney, Agent, or Firm*—Oblon, Spivak, McCelland, Maier & Neustadt, P.C.

[57] ABSTRACT

Electrolytic membrane for light rechargeable batteries essentially consisting of:

1) polymer deriving from the photopolymerization of a mixture essentially consisting of a vinyl ether having the general formula (I) $R-[-O-CH_2CH_2-]_n-O-CH=CH_2$, and a divinyl ether having the general formula (II) $CH_2=CH-[-O-CH_2-CH_2-]_m-O-CH=CH_2$, in a quantity of between 15 and 60% by weight;
2) plasticizer in a quantity of between 35 and 75% by weight;
3) Lithium salt in a quantity of between 5 and 20% by weight;
4) photopolymerization initiator in such a quantity as to photopolymerize (I) and (II);
5) zeolite in a quantity of between 3 and 30% by weight;

the percentage sum of components (1) to (5) being equal to 100.

3 Claims, 4 Drawing Sheets

ELECTROLYTIC MEMBRANE AND PROCESS FOR ITS PHOTO-CROSSLINKING ON A CATHODIC MEMBRANE

This is a continuation of application Ser. No. 08/740,562, filed on Oct. 30, 1996, now U.S. Pat. No. 5,741,610.

The present invention relates to an electrolytic membrane for light rechargeable batteries with a high energy density and the process for its photo-cross-linking on a cathodic membrane.

It is known that the capacity of a cell for light rechargeable batteries depends, apart from the efficiency of the intercalation-deintercalation process of lithium, on the quantity of active cathodic material, i.e., in the case of the above batteries, of $V_6O_{13}$.

As a result, the greater the quantity of active material which can be introduced into the cathode, the greater will be the potential capacity of a cell.

Other energy parameters, such as the density of gravimetric energy (expressed in Wh/kg) and volumetric energy (expressed in Wh/l) are, on the other hand, calculated taking into consideration the weight or total volume of all the components.

Therefore all the other components which together with the cathode form the cell and are essential for its functioning (electrolyte, anode, collectors) can influence its duration and performance, but they do not contribute to its capacity.

In a fine film cell, with the same cathode and therefore capacity, the smaller the thickness of these components the greater will be the values of energy density.

EP-A-638.950 describes electrolytic membranes essentially consisting of polyvinylethers cationically crosslinked with photochemical or chemical activation. The above membranes could have acceptable thicknesses, especially in the case of photochemical activation, but there was the problem of poor processability; in particular it was difficult to package cells using the three layers (electrolyte, cathode and anode) obtained separately.

A possible solution to this problem consisted in preparing a dispersion of non-polymerized polyvinylethers and depositing it on the cathode, thus obtaining a very small thickness, and photochemically polymerizing the mixture of monomers.

As can be seen in the experimental part, this solution had the disadvantage of a poor operability of the corresponding cell.

It has been found however that a solution to the above inconveniences can be validly obtained by using the dispersion of monomers in the presence of zeolites, and this is the object of the present invention.

The use of zeolites in electrolytic membranes is known.

For example EP-A-557.251 describes an electrolytic membrane prepared by casting in acetonitrile, comprising a zeolite, polyethyleneoxide (PEO) and $LiClO_4$ in a weight ratio of 10/20/70 respectively.

In Solid State Ionics 36, 255 (1989), aluminium oxides of various natures ($\alpha$, $\epsilon$, $\theta$) are added to the electrolyte PEO-NaI; the addition of the additive increases the conductivity of the electrolyte as a result of the increase in the amorphous portion.

Similar results are obtained with $\gamma$-alumina added to the electrolyte PEO-NaSCN (Chem. J. Cinese Univers. 2,97 (1986).

Another inorganic matrix widely used in a mixture with polymeric electrolytes is NASICON ($Na_{1+x}Zr_2Si_{3-x}O_{12}$) which is added for example in percentages of about 20% (volume) to PEO; also in this case the presence of the inorganic powder increases the ionic conductivity (Solid State Ionics 28–30, 979, 1988).

In partially crystalline systems such as PEO, the introduction of the zeolite promotes the formation of amorphous phases and consequently increases the ionic conductivity at low temperatures up to values which are 2–3 times greater with respect to membranes based on PEO alone; at room temperature in fact conductivity values of about $10^{-5}$ S/cm are reached.

Electrolytic membranes based on PEO and Zeolites however have the disadvantage of an ionic conductivity which is still insufficient for applications at low temperatures (room or sub-room temperature).

SUMMARY OF THE INVENTION

An electrolytic membrane has now been found which overcomes the drawbacks mentioned above as it has thicknesses of a few tens of microns and good conductivity values at low temperatures. In addition the corresponding cell can function conveniently at temperatures of about 20° C. and even lower and can operate for a higher number of cycles than the analogous system without zeolites.

The present invention also relates to a process for depositing the electrolytic precursor and its crosslinking product, directly on the cathodic membrane.

In accordance with this, the present invention relates to an electrolytic membrane for light rechargeable able batteries essentially consisting of:

1) polymer deriving from the photopolymerization of a mixture essentially consisting of a vinyl ether having the general formula (I) $R-[-O-CH_2CH_2-]_n-O-CH=CH_2$, wherein R represents a methyl or an ethyl and n is an integer between 1 and 16; and a divinyl ether having the general formula (II) $CH_2=CH-[-O-CH_2-CH_2-]_m-O-CH=CH_2$, wherein m is an integer between 1 and 10; the molar ratio between (I) and (II) being from 98/2 to 40/60; in a quantity of between 15 and 60% by weight, preferably between 25 and 35% by weight;

2) plasticizer in a quantity of between 35 and 75% by weight, preferably between 40 and 70% by weight;

3) Lithium salt in a quantity of between 5 and 20% by weight, preferably between 8 and 15% by weight;

4) photopolymerization initiator in such a quantity as to photopolymerize (I) and (II);

5) zeolite in a quantity of between 3 and 30% by weight, preferably between 5 and 20% by weight, the percentage sum of components (1) to (5) being equal to 100.

The term "plasticizer" refers to those substances, well known to experts in the field, which are viscous liquids with a high dielectric ($\epsilon$) constant such as to ensure a high dissociation of the charges. Typical examples of plasticizers are propylenecarbonate (PC) ethylenecarbonate (EC), diethylcarbonate (DEC), dimethylcarbonate (DMC), $\gamma$-butyrolactone and relative mixtures. Another group of plasticizers consists of polyethers (for example tetraglyme, polyethers with a low molecular weight) having a lower dielectric constant but a high chemical stability to lithium.

The above plasticizers, combined with polymeric matrixes and in the presence of Lithium salt, allow a conductivity to be obtained of about $10^{-3}$ S/cm at room temperature and $10^{-4}$ S/cm at $-20°$ C.

The Lithium salt is selected from the normal Lithium salts used in this application, for example $LiCF_3SO_3$, $LiClO_4$, $LiPF_6$, $LiN(CF_3SO_2)_2$, $LiAsF_6$, as such or mixed, it is preferably selected from $LiCF_3SO_3$ and $LiClO_4$.

As far as the photoinitiator is concerned, this is selected from those substances capable of activating the polymerization of (I) and (II) by UV radiation or Electron Beam; the photoinitiators are preferably selected from the salts of triarylsulfonium or triaryliodonium, such as for example triarylsulfoniumhexafluorophosphate and triaryl sulfonium hexafluoroarseniate. They are generally present in quantities of about 0.005–0.8% by weight with respect to the total of the sum of (1) to (5). In the preferred embodiment, the mixture of monomers (I) and (II) is polymerized by treatment with a UV lamp, usually with medium power.

With respect to the zeolite, this term refers to Alumino-Silicates of alkaline or earth-alkaline metals having general formula (III) $y/nMe^{n+}x(SiO_2)y(AlO_2).zH_2O$, wherein Me=Li, Na, K, Ca, Mg, n is the valence of the metal, x/y is between 1 and infinit. Type A zeolites are preferred.

As far as the pore diameter is concerned, it is preferable for the zeolites used to be of the type 3A or 4A, with a pore diameter of about 0.3 and 0.4 nm respectively. With respect to the particle size of the above zeolites, it is preferable for them to have an average diameter of between 2 and 20 µm.

The above electrolytic membrane has a greater conductivity at low temperature than those of the prior art.

A further object of the present invention relates to a process for the preparation of the cathode/electrolyte semicell.

In accordance with this, the present invention relates to a process for the preparation of a cathode/electrolyte semicell which comprises the following steps:

A) deposition, on a current collector consisting of a layer of nickel having a roughness of between 1.0 and 3 microns, of a cathodic paste consisting of:
1) a powder of active cathodic material, preferably $V_6O_{13}$;
2) an electronic conductor, preferably carbon black;
3) a polymeric composition basically consisting of:
3a) a polymer deriving from the polymerization of a mixture of a vinyl ether having general formula (I) R—[—O—CH$_2$CH$_2$—]$_n$—O—CH=CH$_2$, wherein R represents a methyl or an ethyl and n is an integer from 1 to 16; and a divinyl ether having general formula (II) CH$_2$=CH—[—O—CH$_2$—CH$_2$—]$_m$—O—CH=CH$_2$ wherein m is an integer between 1 and 10;
3b) plasticizer and Lithium salts, selected from LiBF$_4$, alone or mixed with other salts;
B) deposition on the collector system-cathodic membrane of step (A) of a dispersion consisting of:
B1) a vinyl ether having general formula (I) R—[—O—CH$_2$CH$_2$—]$_n$—O—CH=CH$_2$, wherein R represents a methyl or an ethyl and n is an integer from 1 to 16;
B2) a divinyl ether having general formula (II) CH$_2$=CH—[—O—CH$_2$—CH$_2$—]$_m$—O—CH=CH$_2$, wherein m is an integer between 1 and 10; the molar ratio between (B1) and (B2) being from 98/2 to 40/60; the quantity of (B1) and (B2) being between 15 and 60% by weight, preferably between 25 and 35% by weight;
B3) plasticizer in a quantity of between 35 and 75% by weight, preferably between 40 and 70% by weight;
B4) Lithium salt in a quantity of between 5 and 20% by weight, preferably between 8 and 15% by weight;
B5) photopolyinerization initiator in such a quantity as to photopolymerize (B1) and (B2);
B6) zeolite in a quantity of between 3 and 30% by weight, preferably between 5 and 20% by weight, the percentage sum of components (B1) to (B6) being equal to 100;

C) photopolymerization of the dispersion deposited in step (B) by exposure to UV radiation, thus obtaining the cathode/electrolyte semicell system.

At the end of step (A) and before step (B), it is preferable to subject the cathodic paste, deposited on the collector system-cathodic membrane, to rolling with a roller. This operation is carried out to make the layer of cathodic paste homogeneous and of the desired thickness.

In one embodiment, at the end of step (A) a layer of non-adhesive plastic material is placed on the layer of cathodic paste. The sandwich consisting of nickel—cathodic paste—polyethylene is then rolled, to a constant thickness, with a roller. At the end of the rolling the plastic sheet is then peeled away from the cathodic surface obtaining thicknesses of a few tens of microns.

With respect to the nickel current collector having a roughness of between 1.0 and 3.0 microns, its preparation is described in the copending patent application filed by the same applicant IT-A-MI 95/a 001650.

The above process comprises the treatment of a nickel plate with particular mixtures of strong acids, for example HF-HNO$_3$, and subsequent etching treatment with argon plasma.

With respect to the $V_6O_{13}$, this is a well-known commercial material which can be obtained, for example, by thermal decomposition starting from ammonium vanadate.

Carbon black is also a commercial product, of which there are various types, for example Ketjen black, super S.

DETAILED DESCRIPTION OF THE INVENTION

The following examples provide a better illustration of the present invention.

EXAMPLE 1

Preparation of the cathodic membrane deposited on nickel.

The polymeric gel (A) is obtained by mixing MVE (triethyleneglycol ethyl vinyl ether, 0.88 grams, 4.3 mmoles, 21.4% by weight), DVE (triethyleneglycol divinylether, 0.38 grams, 1.9 mmoles, 9.3% by weight) and the plasticizer (2.43 grams, 59.1% by weight) consisting of a mixture 1/1 by weight of PC (propylene carbonate) and TGME (tetraglyme), in which the two Lithium salts LiClO$_4$ (0.34 grams, 8.2% by weight) and LiBF$_4$ (84 mg, 2% by weight of the total) are dissolved.

The polymerization and crosslinking of the system with the consequent formation of the polymeric gel englobing the plasticizer and the Lithium salts is completed in about 6 hours.

1b) Preparation of the cathodic paste.

The powder of cathodic active material V$_6$O$_{13}$ (Kerr McGee) is ground, with a ball mill in ceramic material, for 5 hours. After grinding the average diameter of the particles is about 5 microns.

After grinding, the V$_6$O$_{13}$ powder is dried under vacuum at a temperature of about 100° C.

The electronic conductor powder (carbon black "Ketjen Black" of Akzo) is treated following an analogous procedure. In this case the average diameter of the particles is about 20 microns.

V$_6$O$_{13}$ (1.28 grams, 61.7% by weight) and carbon black (0.18 grams, 9% by weight) are put in a cylindrical steel container together with acetonitrile (20 ml). The container is then filled with small rolls of ceramic material, closed and stirred with a rotor for 10 hours. The polymeric gel described in (1a) (0.605 grams, 29.3% by weight) is added to the powder dispersion, which has the appearance of a paint, and the mixture is maintained under stirring for 3 hours.

The cathodic paste is recovered after evaporation of the solvent.

1c) Treatment of the nickel collector.

A nickel sheet (of Teledyne Rodney Metal) having a thickness of 50 microns and a surface of 8×8 cm$^2$ is subjected to surface-cleaning of the physico-chemical type.

This treatment consists in the degreasing of the surface with a hydrocarbon solvent (hexane and/or pentane), followed by immersion in an aqueous solution at 50% of HF/HNO$_3$, in a molar ratio of 1 to 2.

The nickel sheet is maintained in immersion for a time varying from 3 to 5 minutes, is then repeatedly washed with distilled water and dried in an oven at 100° C. under vacuum.

This first treatment enables the surface to be cleaned eliminating any possible traces of surface oxides.

The subsequent treatment of a physical nature is carried out by plasma etching with argon. The power, pressure and time experimental conditions used are the following: Power: 100–200 Watts; Pressure: 35 mbars; Time: 30–60 seconds.

At the end of the treatment, the thickness of the nickel sheet varies from 30 to 40 microns, in relation 5 to the residence time in the acid solution. The roughness of the nickel sheet is between 1.2 and 1.6 microns.

1d) Deposition of the cathodic composite on the Nickel collector.

A certain quantity of cathodic paste of 1b, is deposited on the nickel sheet treated as described in (1c).

A sheet of plastic material (for example polyethylene or polypropylene), which does not have adhesive characteristics with respect to the cathodic paste itself, is then placed on the cathodic paste.

The sandwich consisting of nickel—cathodic paste—polyethylene is then rolled, to a controlled thickness, with a roller. The plastic sheet is then 20 peeled away from the cathodic surface; in this way a thickness of cathodic membrane of 30 microns is obtained.

EXAMPLE 2

Preparation of the electrolytic membrane containing an inorganic powder on a cathodic membrane.

A mixture is prepared consisting of: MVE (1.01 grams, 4.95 mmoles, 20.6% by weight), DVE (0.434 grams, 2.14 mmoles, 8.8% by weight), the plasticizer consisting of a mixture 1/1 by weight of propylenecarbonate (PC)—Tetraethyleneglycol dimethylether (TGME) (2.57 grams, 52.4% by weight), which contains the Lithium salt LiClO$_4$, (0.44 grams, 8.8% by weight) dissolved together with a photopolymerization initiator, triaryl-sulfonium-hexafluorophosphate (0.02% by weight).

The zeolite A (0.46 grams, 9.4% by weight) previously ground in a ball mill up to a particle size of about 5 $\mu$m and dried at 200° C. under vacuum is added to this mixture. The whole mixture is then treated with an ultrasonic probe to obtain a good dispersion of the zeolite.

The mixture is deposited directly onto the cathodic membrane, whose preparation is described in example 1, with a doctor-blade and photopolymerized by UV with a medium power lamp. The crosslinking times vary from 5 to 10 seconds, depending on the thickness of the membrane. Membranes with a thickness of between 50 and 200 $\mu$m are usually obtained.

The ionic conductivity ($\sigma$) at 25° C. of the electrolytic membrane is equal to 8.3.10$^{-4}$ S/cm.

COMPARATIVE EXAMPLE 3

Preparation of an electrolytic membrane on a cathodic membrane.

A mixture is prepared consisting of: MVE (0.63 grams, 3.1 mmoles, 15.4% by weight), DVE (0.63 grams, 3.1 mmoles, 15.4% by weight), the plasticizer consisting of a mixture 1/1 by weight of PC—TGME (2.43 grams, 59% by weight), which contains the Lithium salt LiClO$_4$ (0.43 grams, 10% by weight) dissolved together with a photopolymerization initiator, triarylsulfoniumhexafluorophosphate (0.02% by weight).

The homogeneous mixture is deposited directly onto the cathodic membrane of example 1 by means of a doctor-blade, and the electrolytic membrane is then obtained by UV radiation carried out with a medium power lamp with crosslinking times varying from 1 to 5 seconds, depending on the thickness of the membrane. Membranes with a thickness of between 50 and 200 $\mu$m are usually obtained.

The ionic conductivity (a) at 25° C. is equal to 3.0.10$^{-4}$ S/cm.

COMPARATIVE EXAMPLE 4

Preparation of an electrolytic membrane based on PEO containing zeolite.

A dispersion of zeolite A (20 mg, 10% by weight) in acetonitrile is treated with an ultrasonic probe. PEO (140 mg, 70% by weight) dissolved in acetonitrile (10 ml) and LiClO$_4$ (40 mg, 20% by weight) are added to this and a further treatment with the ultrasonic probe is carried out. The dispersion obtained is deposited in a teflon container and the solvent is slowly removed in an argon stream. The membrane obtained has a thickness equal to 30 $\mu$m.

The ionic conductivity ($\sigma$) at a temperature of 80° C. is equal to 1.8.10$^{-5}$ S/cm, whereas at 25° C. it is equal to 10$^{-7}$ S/cm.

COMPARATIVE EXAMPLE 5

Packaging of a unit cell.

A unipolar button cell having a surface equal to 1 cm$^2$ is obtained by superimposing:

a 1 cm$^2$ disk of a multilayer system (cathode/electrolyte semicell) consisting of a nickel collector, cathodic membrane, electrolytic membrane, obtained directly on the cathode by UV radiation according to the procedure described in comparative Example 3;

a 1 cm$^2$ Lithium disk, having a thickness of 150 µm.

The cathodic membrane having a thickness of 30 µm and a weight of 8 mg has the following composition:

$V_6O_{13}$ =4.9 mg (61.7% by weight)
Ketjen Black=0.7 mg (8.9% by weight)
Polymeric gel 1a=2.3 mg (29.4% by weight)

The cell has capacities equal to 1 mAh (based on the practical capacity of $V_6O_{13}$ equal to 200 mAh/gr).

The electrolytic membrane having a thickness of 100 µm has the following composition:

MVE=15.4% by weight
DVE=15.4% by weight
PC-TGME 1/1=59.0% by weight
$LiClO_4$=10.0% by weight
Triarylsulfoniumhexafluorophosphate=0.05% by weight The cell is then housed between two steel current-holders and inserted in a teflon container equipped with a pressure spring to maintain a good contact between the various components.

Figure 1:
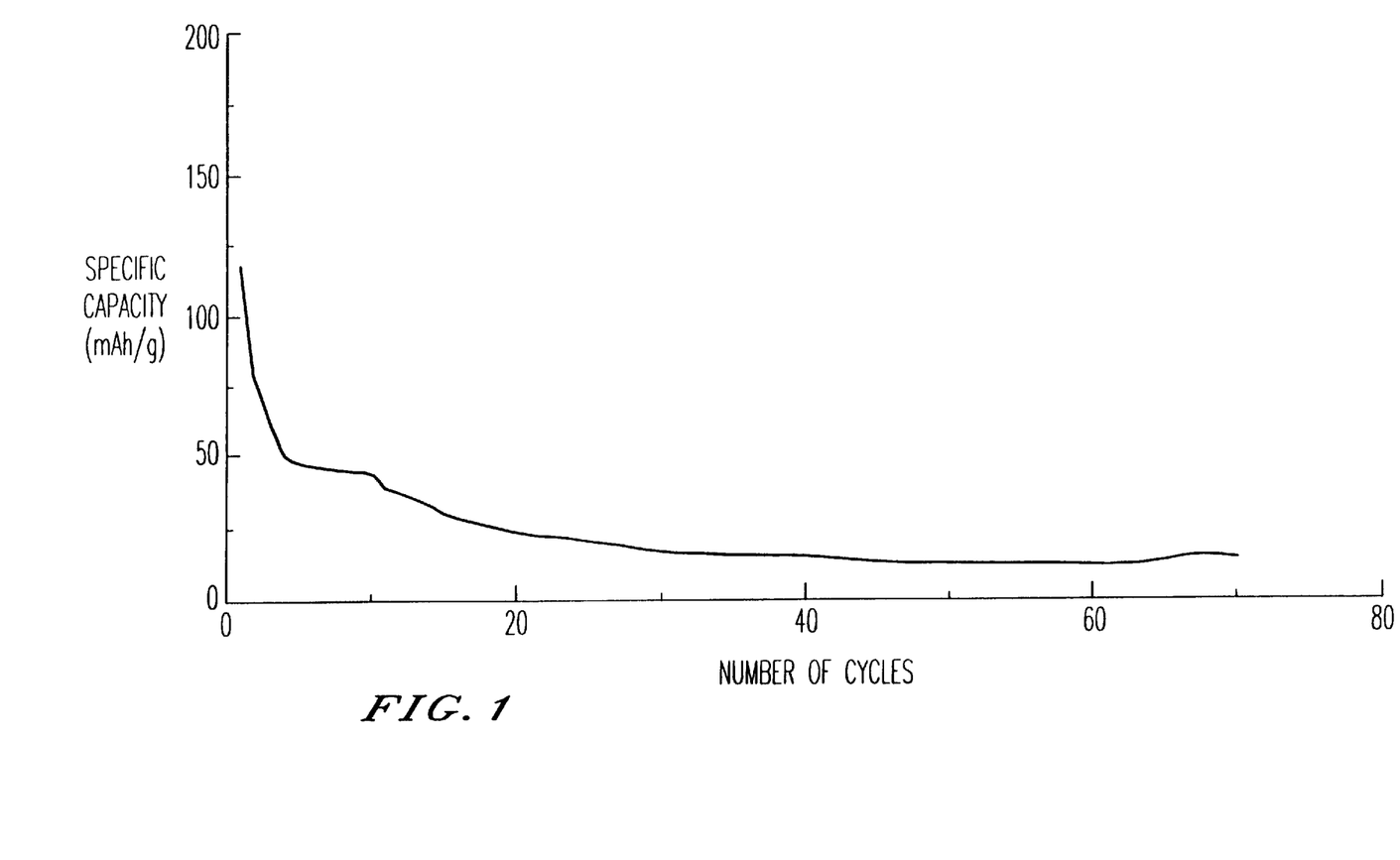
FIG. 1 shows the specific capacity expressed in mAh/gr (of cathodic active material $V_6O_{13}$) of the cell of comparative example 5, in relation to the number of cycles, cycled at a temperature of 25° C.

FIG. 1 shows the specific capacity of the cell, cycled at 25° C., in relation to the number of cycles, obtained with constant discharge and recharge currents during the cycles and in particular:

Discharge current=0.25 mA
Recharge current (elect.plat.)=0.25 mA
Operating voltage=2–3.2 V

EXAMPLE 6

Packaging of a unit cell.

A unipolar 1 cm$^2$ cell is obtained with the same procedure described in example 5, using an electrolytic membrane obtained according to the procedure of example 2.

The cathodic membrane, having a thickness of 30 µm, has the following composition:

$V_6O_{13}$=5 mg (62.5% by weight)
Ketjen Black=0.7 mg (8.7% by weight)
Polymeric gel 1a=2.3 mg (28.8% by weight) and a weight of 8 mg. The cell has capacities equal to 1 mAh (based on the practical capacity of $V_6O_{13}$ equal to 200 mAh/gr).

Figure 2:
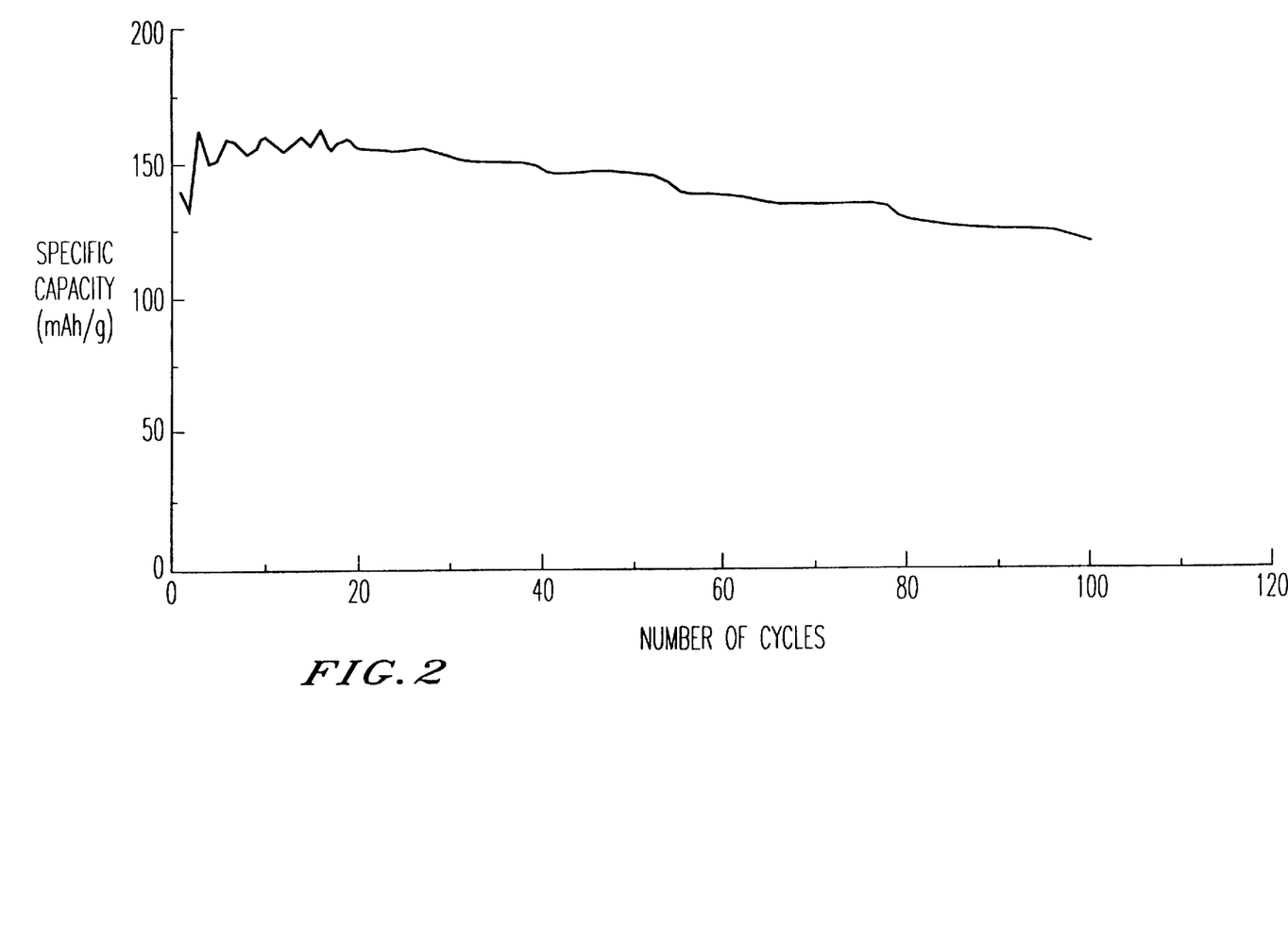
FIG. 2 shows the specific capacity expressed in mAh/gr (of cathodic active material $V_6O_{13}$) of the cell of example 6, in relation to the number of cycles, cycled at a temperature of 25° C.
Figure 3:
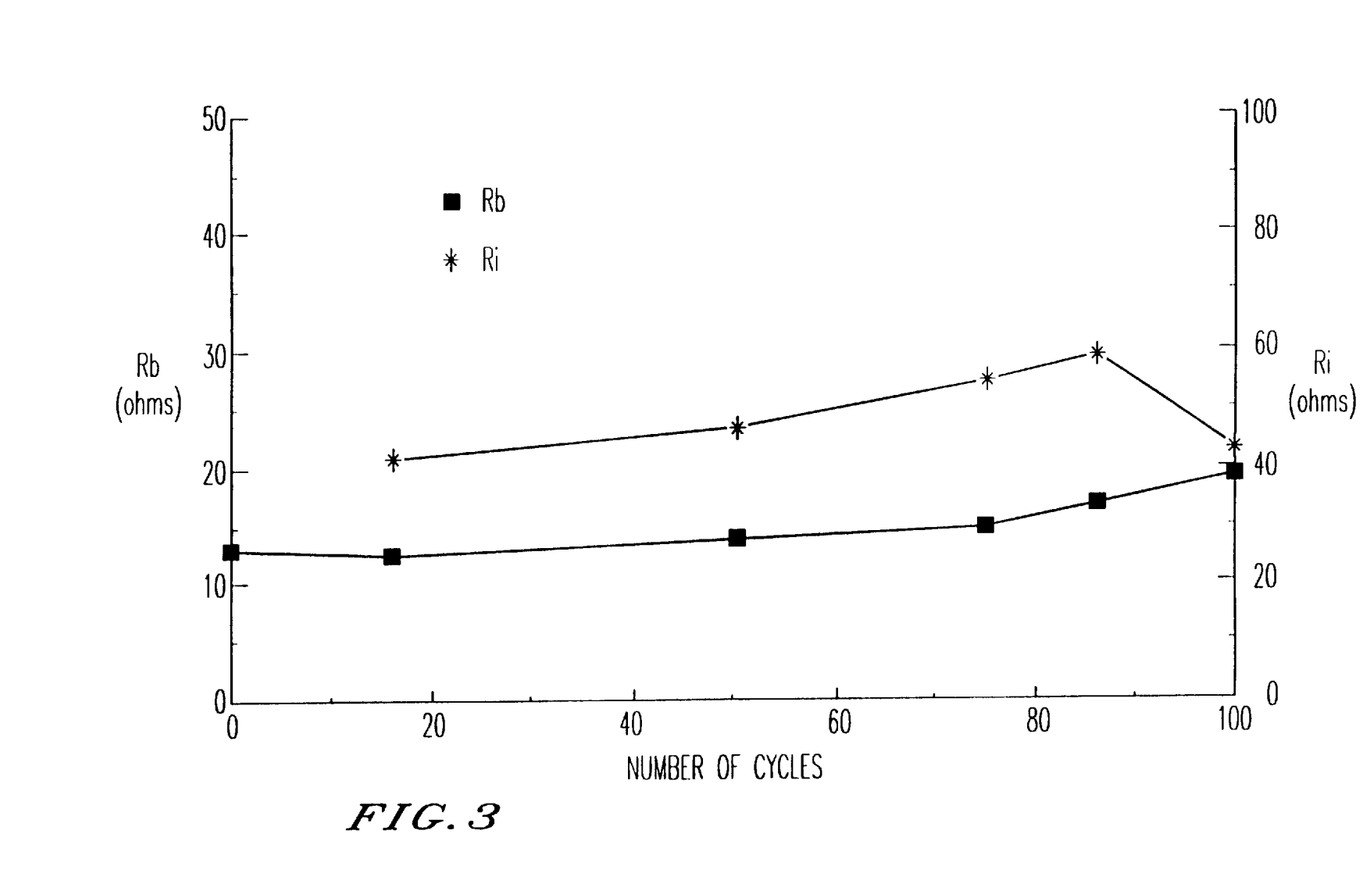
FIG. 3 shows the resistance of the electrolyte (Rb) and the interfacial resistance (Ri), expressed in ohms, of the cell of example 6, in relation to the number of cycles.

The electrolytic membrane having a thickness of 120 µm and a weight equal to 14.8 mg, has the following composition:

MVE=20.6% by weight
DVE=8.8% by weight
PC-TGME 1/1=52.4% by weight
$LiClO_4$=8.8% by weight
Triarylsulfoniumhexafluorophosphate=0.04% by weight
Zeolite=9.4% by weight FIG. 2 shows the specific capacity of the cell, cycled at 25° C., in relation to the number of cycles, obtained with constant discharge and recharge currents during the cycles and in particular:

Discharge current=0.52 mA
Recharge current (elect.plat.)=0.26 mA
Operating voltage=2–3.2 V FIG. 3 shows the trend of the interfacial resistance (Ri) and that of the electrolyte (Rb) during the charging and discharging cycles, determined by complex impedance measurements.

Figure 4:
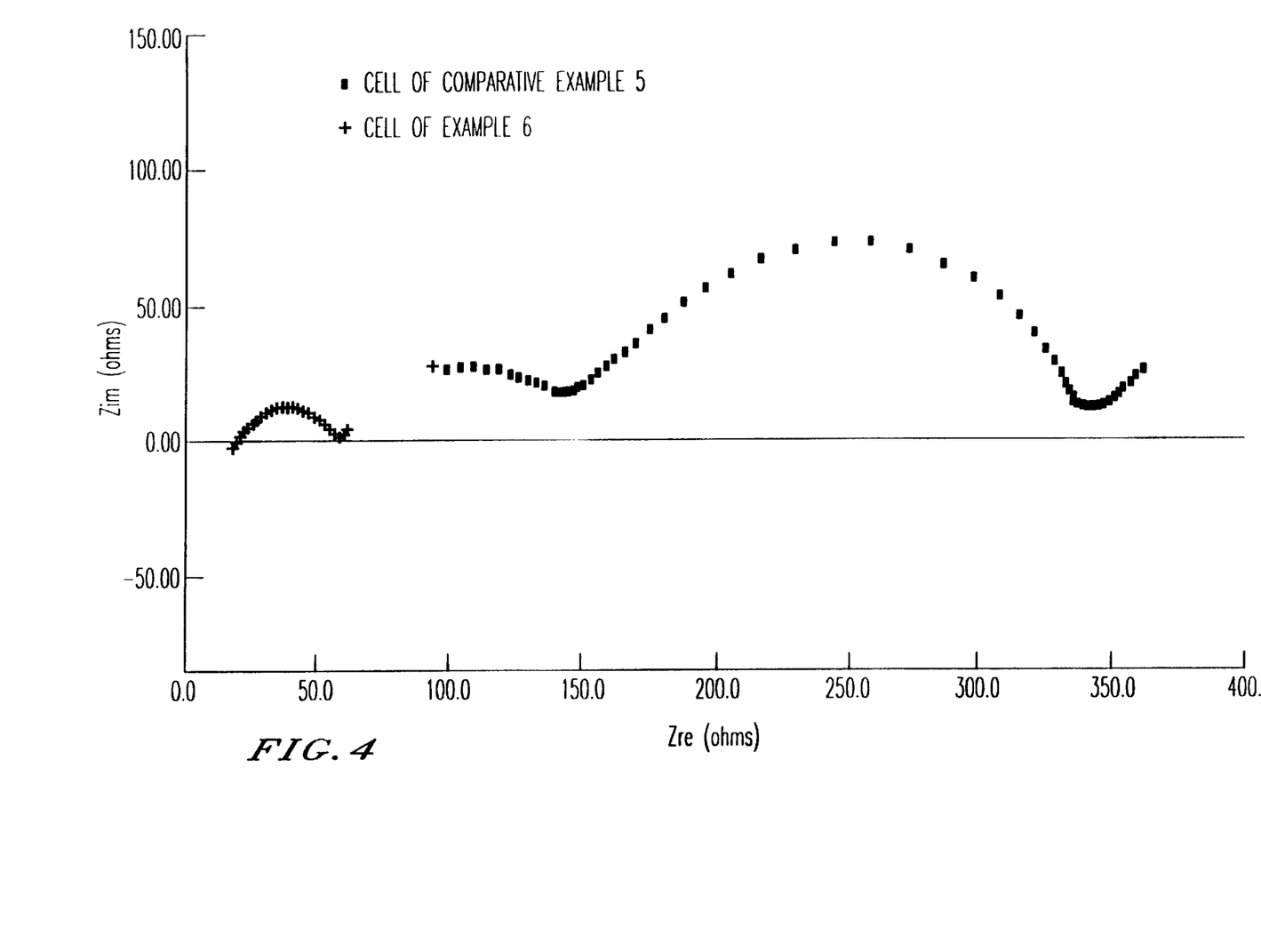
FIG. 4 shows the electrical impedance diagrams of the cells of example 6 and comparative example 5. In abscissa there is the actual impedance component and in ordinate the imaginary component, both expressed in ohms. The experimental points are taken at different frequencies which go from 100 kHz (low impedance values) to 10 mHz (high impedance values) ; the intercepts of the curve with the actual axis determine the resistances relating to the polymeric component (Rb) and to the interfaces (Ri) of the cell.

FIG. 4 shows a comparison between the complex impedance diagrams of the cell of example 6 (at the hundredth charging and discharging cycle) and of the cell of comparative example 5.

It can be seen how both the interfacial resistance (Ri) and that of the electrolyte (Rb) are considerably reduced with the use of the electrolyte of the present invention.

COMPARATIVE EXAMPLE 7

A cell having a surface equal to 1 cm$^2$ is obtained by superimposing:

a 1 cm$^2$ disk of a cathodic membrane deposited on a nickel collector obtained according to the procedure described in example 1d. The cathode has a thickness equal to 30 µm and a weight of 8 mg (5 mg $V_{6O13}$, 0.7 mg carbon black, 2.3 mg of polymeric gel of Example 1a);

a 1 cm$^2$ disk of electrolytic membrane having a thickness of 30 µm and a weight of 4 mg obtained according to the procedure described in comparative example 4;

a 1 cm$^2$ lithium disk, having a thickness of 150 µm.

The cell has a capacity equal to 1 mAh (based on the practical capacity of $V_6O_{13}$ equal to about 200 mAh/g).

The cell is then housed between two steel current-holders and inserted in a teflon container equipped with a pressure spring to maintain good contact between the various components.

The cell thus packaged is not capable of functioning at room temperature.

It is then heated to a temperature of 80° C. and cycled, using constant discharge and recharge currents during the cycles and in particular:

Discharge current=0.01 mA
Recharge current (elect.plat.)=0.01 mA
operating voltage=2–3.2 V The currents used are considerably lower than those used in the examples of the present invention, as the cell is not capable of functioning with higher currents.

Under these conditions a specific capacity is obtained equal to 0.0044 mAh, much lower than that obtained with the use of the electrolyte of the present invention.

We claim:

1. A process for the preparation of a cathode/electrolyte semicell which comprises the following steps:

A) deposition, on a current collector consisting of a layer of nickel having a roughness of between 1.0 and 3 microns, of a cathodic paste consisting of:

1) a powder of active cathodic material;
2) an electronic conductor;
3) a polymeric composition basically consisting of:
   3a) a polymer deriving from the polymerization of a mixture of a vinyl ether having general formula (I) $R-[-O-CH_2CH_2-]_n-O-CH=CH_2$, wherein R represents a methyl or an ethyl and n is an integer from 1 to 16; and a divinyl ether having general formula (II) $CH_2=CH-[-O-CH_2-CH_2-]_m-O-CH=CH_2$, wherein m is an integer between 1 and 10;
   3b) plasticizer and Lithium salts, selected from $LiBF_4$, alone or mixed with other salts;

B) deposition on the collector system-cathodic membrane of step (A) of a dispersion consisting of:

B1) a vinyl ether having general formula (I) $R-[-O-CH_2CH_2-]_n-O-CH=CH_2$, wherein R represents a methyl or an ethyl and n is an integer from 1 to 16;

B2) a divinyl ether having general formula (II) $CH_2=CH-[-O-CH_2-CH_2-]_m-O-CH=CH_2$, wherein m is an integer between 1 and 10; the molar ratio between (B1) and (B2) being from 98/2 to 40/60; the quantity of (B1) and (B2) being between 15 and 60% by weight, B3) plasticizer in a quantity of between 35 and 75% by weight;

B4) Lithium salt in a quantity of between 5 and 20% by weight;

B5) photopolymerization initiator in such a quantity as to photopolymerize (B1) and (B2);

B6) zeolite in a quantity of between 3 and 30% by weight, the percentage sum of components (B1) to (B6) being equal to 100;

C) photopolymerization of the dispersion deposited in step (B) by exposure to UV radiation, thus obtaining the cathode/electrolyte semicell system.

2. The process according to claim 1, wherein the active cathodic material is $V_6O_{13}$ and the electronic conductor is carbon black.

3. The process according to claim 1, characterized in that:

the quantity of B1+B2 is between 25 and 35% by weight;

the plasticizer B3 is in a quantity of between 40 and 70% by weight;

the Lithium salt B4 is in a quantity of between 8 and 15% by weight;

the zeolite B6 is in a quantity of between 5 and 20% by weight.

* * * * *

UNITED STATES PATENT AND TRADEMARK OFFICE
CERTIFICATE OF CORRECTION

PATENT NO. : 5,873,915
DATED : February 23, 1999
INVENTOR(S) : Maria ANDREI, et al.

It is certified that error appears in the above-identified patent and that said Letters Patent is hereby corrected as shown below:

On the title page, item [73], the first assignee is incorrect. It should be:

--Eniricerche S.p.A.--

Signed and Sealed this

Third Day of August, 1999

Attest:

Q. TODD DICKINSON

*Attesting Officer*

*Acting Commissioner of Patents and Trademarks*